United States Patent
Hofer et al.

(10) Patent No.: US 10,077,660 B2
(45) Date of Patent: Sep. 18, 2018

(54) TURBINE ENGINE ASSEMBLY AND METHOD OF MANUFACTURING

(71) Applicant: General Electric Company, Schenectady, NY (US)

(72) Inventors: Douglas Carl Hofer, Clifton Park, NY (US); Narendra Digamber Joshi, Schenectady, NY (US); Michael Solomon Idelchik, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 348 days.

(21) Appl. No.: 14/802,074

(22) Filed: Jul. 17, 2015

(65) Prior Publication Data

US 2016/0160647 A1    Jun. 9, 2016

Related U.S. Application Data

(60) Provisional application No. 62/086,858, filed on Dec. 3, 2014.

(51) Int. Cl.
*F02K 3/065* (2006.01)
*F01D 1/04* (2006.01)
*F02K 3/077* (2006.01)

(52) U.S. Cl.
CPC .............. *F01D 1/04* (2013.01); *F02K 3/065* (2013.01); *F02K 3/077* (2013.01)

(58) Field of Classification Search
None
See application file for complete search history.

(56) References Cited

U.S. PATENT DOCUMENTS 4,790,133 A * 12/1988 Stuart ............... F02C 3/067
 415/65
4,860,537 A    8/1989 Taylor
(Continued)

OTHER PUBLICATIONS

Joly et al.,"Full Design of a Highly Loaded and Compact Contra-Rotating Fan Using Multidisciplinary Evolutionary Optimization", ASME Turbo Expo 2013: Turbine Technical Conference and Exposition, vol. 6B, 10 Pages, Jun. 3-7, 2013, San Antonio, Texas, USA.
Naveen et al.,"CFD analysis of low pressure turbine blade using vortex generator jets", Intelligent Systems and Control (ISCO), 2013 7th International Conference on, IEEE Xplore, pp. 541-544, Jan. 4-5, 2013, Coimbatore, Tamil Nadu, India.

*Primary Examiner* — Igor Kershteyn
*Assistant Examiner* — Theodore Ribadeneyra
(74) *Attorney, Agent, or Firm* — GE Global Patent Operation; Nitin Joshi

(57) ABSTRACT

A turbine engine assembly is provided. The assembly includes a low-pressure turbine assembly including a first turbine section configured to rotate in a first rotational direction at a first rotational speed, and a second turbine section configured to rotate in a second rotational direction at a second rotational speed. The second rotational direction is opposite the first rotational direction and the second rotational speed is lower than the first rotational speed. The assembly also includes a first drive shaft coupled to the first turbine section, and a fan assembly including a first fan section coupled to the first drive shaft such that the first fan section rotates in the first rotational direction at the first rotational speed, and a second fan section coupled to the second turbine section such that the second fan section rotates in the second rotational direction at the second rotational speed.

20 Claims, 5 Drawing Sheets

(56) References Cited

U.S. PATENT DOCUMENTS

| | | | |
|---|---|---|---|
| 5,058,379 A | 10/1991 | Lardellier | |
| 5,079,916 A | 1/1992 | Johnson | |
| 5,105,618 A | 4/1992 | Lardellier | |
| 5,404,713 A * | 4/1995 | Johnson | F02K 1/825 60/204 |
| 7,299,621 B2 | 11/2007 | Bart et al. | |
| 7,334,981 B2 * | 2/2008 | Moniz | F01D 25/16 29/889.2 |
| 7,685,808 B2 | 3/2010 | Orlando et al. | |
| 7,841,165 B2 | 11/2010 | Orlando et al. | |
| 7,921,634 B2 | 4/2011 | Orlando et al. | |
| 8,297,039 B2 | 10/2012 | Scothern | |
| 8,747,055 B2 * | 6/2014 | McCune | F02K 3/06 415/122.1 |
| 9,140,212 B2 * | 9/2015 | Moon | F02K 3/025 |
| 2005/0047942 A1 * | 3/2005 | Grffin, III | F02K 3/072 417/423.1 |
| 2006/0090451 A1 * | 5/2006 | Moniz | F01D 1/24 60/226.1 |
| 2006/0093467 A1 * | 5/2006 | Orlando | F01D 1/26 415/68 |
| 2013/0000322 A1 * | 1/2013 | Silkowski | F01D 7/00 60/792 |
| 2013/0327014 A1 | 12/2013 | Moulebhar | |

* cited by examiner

TURBINE ENGINE ASSEMBLY AND METHOD OF MANUFACTURING

CROSS REFERENCE TO RELATED APPLICATIONS

This application claims priority to U.S. Provisional Application No. 62/086,858 filed Dec. 3, 2014, which is hereby incorporated by reference in its entirety.

BACKGROUND

The present disclosure relates generally to turbine engines and, more specifically, to turbine engines including counter-rotating turbine and fan assemblies.

At least some known gas turbine engines, such as turbofans, include a fan, a core engine, and a power turbine. The core engine includes at least one compressor, a combustor, and a high-pressure turbine coupled together in a serial flow relationship. More specifically, the compressor and high-pressure turbine are coupled through a shaft to form a high-pressure rotor assembly. Air entering the core engine is mixed with fuel and ignited to form a high energy gas stream. The high energy gas stream flows through the high-pressure turbine to rotatably drive the high-pressure turbine such that the shaft rotatably drives the compressor. After being discharged from the high-pressure turbine, the gas stream continues to expand as it flows through a low-pressure turbine positioned aft of the high-pressure turbine. The low-pressure turbine includes a rotor assembly coupled to a drive shaft and a fan. The low-pressure turbine rotatably drives the fan through the drive shaft.

Many modern commercial turbofans are manufactured with increasingly large bypass ratios to facilitate improving engine efficiency. However, increasing the bypass ratio of the turbofan results in an increased fan size and fan tip speed, which must be controlled to maintain the efficiency of the turbofan. As such, the low-pressure turbine in such turbofans is generally manufactured with a large number of stages, which increases the weight of the turbine and facilitates reducing the fan tip speed. Moreover, at least some known turbofans include a speed-reducing gearbox coupled along the drive shaft between the low-pressure turbine and the fan, such that the fan tip speed (m/s) is decoupled from the speed (RPMs) of the low-pressure turbine. However, utilizing speed-reducing gearboxes generally increases the weight and the complexity of the turbofan, and introduces further challenges in maintaining engine efficiency.

BRIEF DESCRIPTION

In one aspect, a turbine engine assembly is provided. The assembly includes a low-pressure turbine assembly including a first turbine section configured to rotate in a first rotational direction at a first rotational speed, and a second turbine section configured to rotate in a second rotational direction at a second rotational speed. The second rotational direction is opposite the first rotational direction and the second rotational speed is lower than the first rotational speed. The assembly also includes a first drive shaft coupled to the first turbine section. A fan assembly including a first fan section is coupled to the first drive shaft such that the first fan section is configured to rotate in the first rotational direction at the first rotational speed, and a second fan section is coupled to the second turbine section such that the second fan section is configured to rotate in the second rotational direction at the second rotational speed.

In another aspect, a turbine engine assembly is provided. The turbine engine assembly includes a low-pressure turbine assembly including a first turbine section configured to rotate in a first rotational direction at a first rotational speed, and a second turbine section configured to rotate in a second rotational direction at a second rotational speed. The second rotational direction is opposite the first rotational direction and the second rotational speed is lower than the first rotational speed. The assembly also includes a first drive shaft coupled to the first turbine section, a second drive shaft coupled to the second turbine section, and a fan assembly including a first fan section coupled to the first drive shaft, and a second fan section coupled to the second drive shaft. The first fan section is configured to rotate in the first rotational direction at the first rotational speed. The first fan section extends a first distance from a centerline of the turbine engine assembly to define a first forward fan face. The second fan section is configured to rotate in the second rotational direction at the second rotational speed. The second fan section extends a second greater distance from the centerline to define a second forward fan face.

In yet another aspect, a method of manufacturing a turbine engine assembly is provided. The method includes coupling a first low-pressure turbine section to a first drive shaft and, wherein the first low-pressure turbine section is configured to rotate in a first rotational direction at a first rotational speed. The method further includes coupling the first drive shaft to a first fan section such that the first fan section is configured to rotate in the first rotational direction at the first rotational speed, and coupling a second fan section to a second low-pressure turbine section. The second low-pressure turbine section is configured to rotate in a second rotational direction at a second rotational speed such that the second fan section rotates in the second rotational direction at the second rotational speed, wherein the second rotational direction is opposite the first rotational direction and the second rotational speed is lower than the first rotational speed.

DRAWINGS

These and other features, aspects, and advantages of the present disclosure will become better understood when the following detailed description is read with reference to the accompanying drawings in which like characters represent like parts throughout the drawings, wherein.

Figure 1:
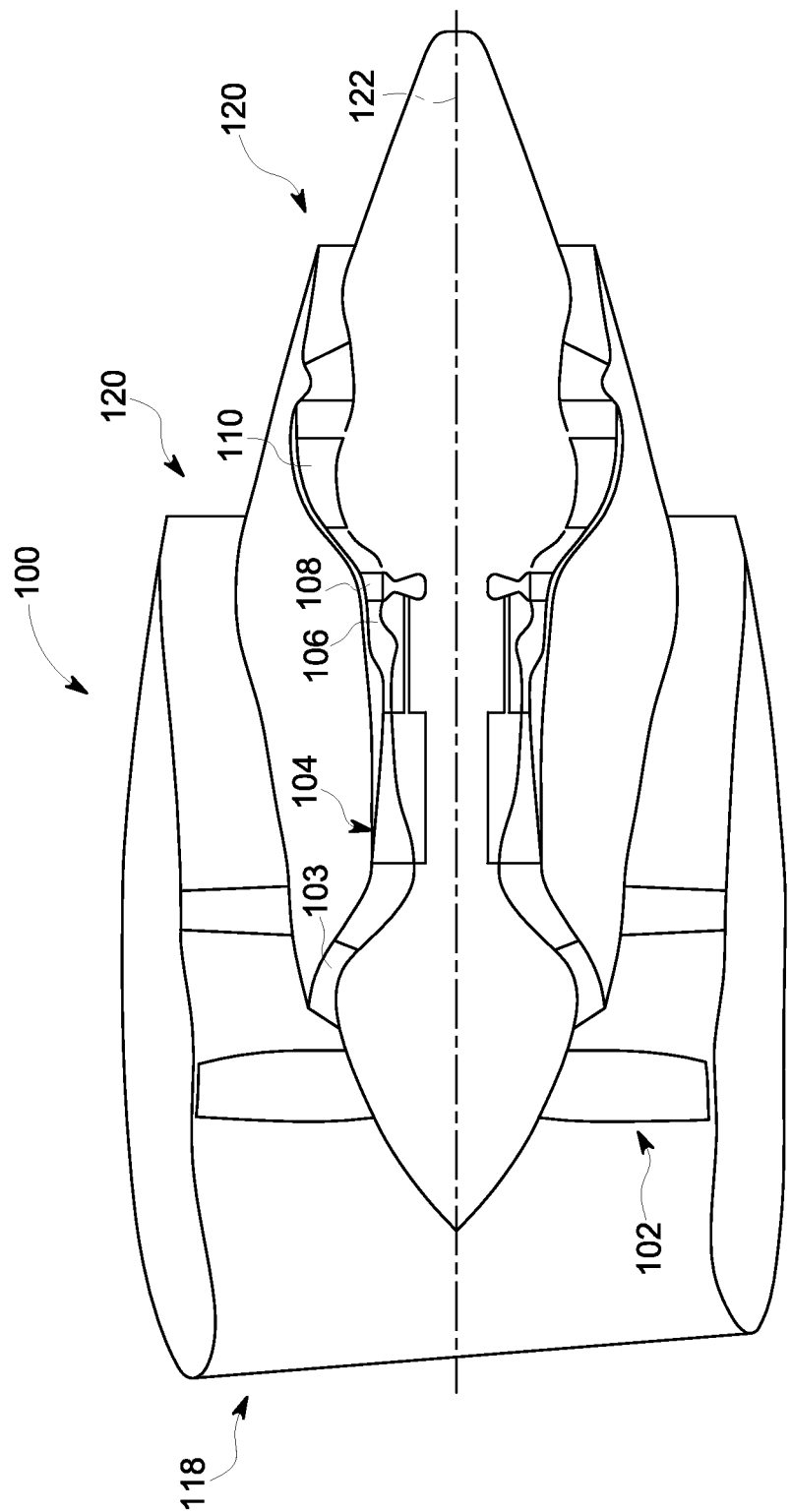
FIG. 1 is a schematic illustration of an exemplary turbine engine assembly.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Embodiments of the present disclosure relate to turbine engine assemblies including counter-rotating turbine and fan assemblies. More specifically, the turbine engine assemblies described herein include a first low-pressure (LP) turbine section that rotates in a first rotational direction at a first rotational speed, and a second LP turbine section that rotates in an opposing second rotational direction at a second rotational speed lower than the first rotational speed. A first fan section is coupled to the first LP turbine section and a second fan section is coupled to the second LP turbine section. The second fan section has a larger radius than the first fan section. As such, separating the LP turbine into counter-rotating sections that operate at different speeds, and coupling the LP turbine sections to their respective counter-rotating fan sections enables the fan tip speed of the larger radius fan section to be reduced in an efficient and simplified manner. Moreover, the assembly described herein facilitates maintaining high bypass ratios of the turbine engine and, in some embodiments, enables a booster compressor to operate at increased speeds.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine. It should also be appreciated that the term "fluid" as used herein includes any medium or material that flows, including, but not limited to, air, gas, liquid and steam.

FIG. 1 is a schematic illustration of an exemplary turbine engine assembly 100 including a fan assembly 102, a booster compressor assembly 103, a high-pressure compressor assembly 104, and a combustor 106. Fan assembly 102, booster compressor assembly 103, high-pressure compressor assembly 104, and combustor 106 are coupled in flow communication. Turbine engine assembly 100 also includes a high-pressure turbine assembly 108 coupled in flow communication with combustor 106 and a low-pressure turbine assembly 110. Turbine engine assembly 100 has an intake 118 and an exhaust 120. Turbine engine assembly 100 further includes a centerline 122 about which fan assembly 102, booster compressor assembly 103, high-pressure compressor assembly 104, and turbine assemblies 108 and 110 rotate.

In operation, a portion of the air entering turbine engine assembly 100 through intake 118 is channeled through fan assembly 102 towards booster compressor assembly 103. Compressed air is discharged from booster compressor assembly 103 towards high-pressure compressor assembly 104. Highly compressed air is channeled from high-pressure compressor assembly 104 towards combustor 106, mixed with fuel, and the mixture is combusted within combustor 106. High temperature combustion gas generated by combustor 106 is channeled towards turbine assemblies 108 and 110. Combustion gas is subsequently discharged from turbine engine assembly 100 via exhaust 120.

Figure 2:
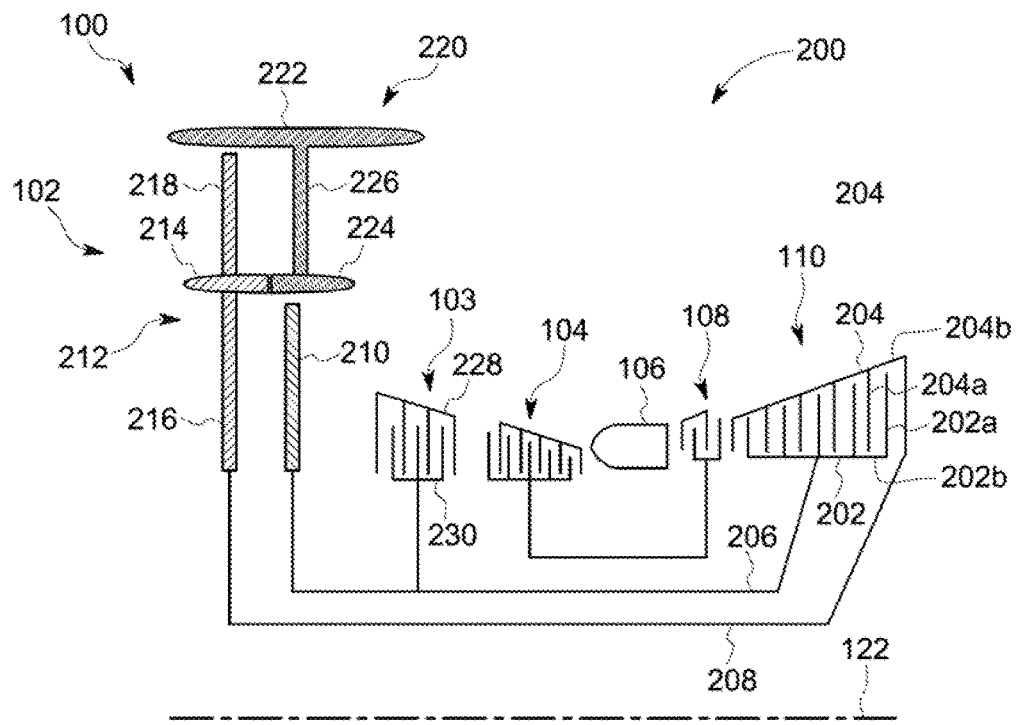
FIG. 2 is a schematic illustration of a first embodiment of the turbine engine assembly shown in FIG. 1.

FIG. 2 is a schematic illustration of a first embodiment 200 of turbine engine assembly 100. In the exemplary embodiment, low-pressure turbine assembly 110 includes a first turbine section 202 including a plurality of rows of rotor blades 202a coupled to a rotor structure 202b and a second turbine section 204 including a plurality of rows of rotor blades 204a coupled to an outer casing 204b, the plurality of blades 202a of the first turbine section 202 in an alternating arrangement (interlaced) with the plurality of blades 204a of the second turbine section 204. Turbine engine assembly 100 also includes a first drive shaft 206 coupled to first turbine section 202, and a second drive shaft 208 coupled to second turbine section 204. In operation, as combustion gas is channeled through low-pressure turbine assembly 110, first turbine section 202 rotates in a first rotational direction at a first rotational speed, and second turbine section 204 rotates in a second rotational direction at a second rotational speed. The second rotational direction is opposite the first rotational direction and the second rotational speed is lower than the first rotational speed.

Fan assembly 102 includes a first fan section 210 coupled to first drive shaft 206, and a second fan section 212 coupled to second drive shaft 208. First fan section 210 extends a first radial distance from centerline 122 of turbine engine assembly 100, and second fan section 212 extends a second radial distance from centerline 122. The second radial distance is greater than the first radial distance. Moreover, second fan section 212 includes a splitter 214 that defines an inner radial portion 216 and an outer radial portion 218 extending from inner radial portion 216. In some embodiments, the radial location of splitter 214 along second fan section 212 is selected to modify the shaft work split between first and second drive shafts 206 and 208.

In some embodiments, turbine engine assembly 100 also includes a guide vane assembly 220 positioned aft of fan assembly 102. Guide vane assembly 220 includes a nacelle housing 222, a casing 224 positioned radially inward from nacelle housing 222, and an outer guide vane 226 extending there between. A radial location of casing 224 is selected to be substantially aligned with splitter 214, such that outer guide vane 226 is substantially coaxially aligned with outer radial portion 218 of second fan section 212. Outer guide vane 226 is positioned aft of outer radial portion 218, and facilitates modifying a swirl of the flow of air discharged from second fan section 212. Moreover, in first embodiment 200, rotor blades (not shown) of first fan section 210 and inner radial portion 216 of second fan section 212 are oriented such that at least a portion of a flow of air discharged from fan assembly 102 is channeled directly towards booster compressor assembly 103 without needing to alter the swirl of the flow of air with a guide vane positioned there between. In an alternative embodiment, nacelle housing 222 is omitted from turbine engine assembly 100, providing an unducted fan assembly 102.

As described above, first fan section 210 is coupled to first drive shaft 206, and second fan section 212 is coupled to second drive shaft 208. More specifically, first fan section 210 is coupled to first turbine section 202 via first drive shaft 206, and second fan section 212 is coupled to second turbine section 204 via second drive shaft 208. In operation, first fan section 210 rotates in the first rotational direction at the first rotational speed, and second fan section 212 rotates in the second rotational direction at the second rotational speed. As such, a fan tip speed of second fan section 212 is controlled by rotating second fan section at the lower rotational speed dictated by second turbine section 204, and first fan section 210 is allowed to rotate at the higher rotational speed of first turbine section 202.

In the exemplary embodiment, booster compressor assembly 103 includes a first stator 228 and a first rotor 230 coupled to first drive shaft 206. In operation, first rotor 230 rotates in the first rotational direction at the first rotational speed. As such, the rotational speed of first rotor 230 is based on the rotational speed of first turbine section 202, which facilitates increasing the speed of booster compressor assembly 103.

Figure 3:
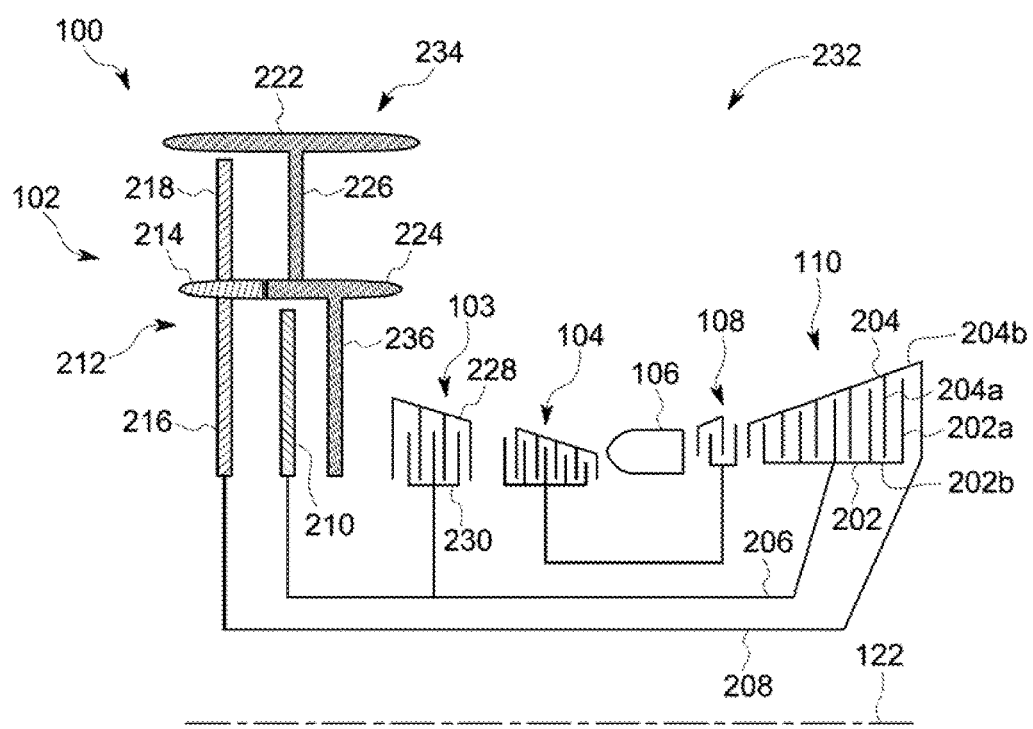
FIG. 3 is a schematic illustration of a second embodiment of the turbine engine assembly shown in FIG. 1.

FIG. 3 is a schematic illustration of a second embodiment 232 of turbine engine assembly 100. In the exemplary embodiment, second embodiment 232 includes a guide vane assembly 234 positioned aft of fan assembly 102. Specifically, guide vane assembly 234 includes outer guide vane 226, and an inner guide vane 236 extending radially inward from casing 224. Inner guide vane 236 is positioned aft of and substantially coaxially aligned with first fan section 210 and inner radial portion 216 of second fan section 212. As such, inner guide vane 236 facilitates modifying a swirl of the flow of air discharged from first fan section 210, and provides greater flexibility in managing the work split between first fan section 210 and inner radial portion 216.

Figure 4:
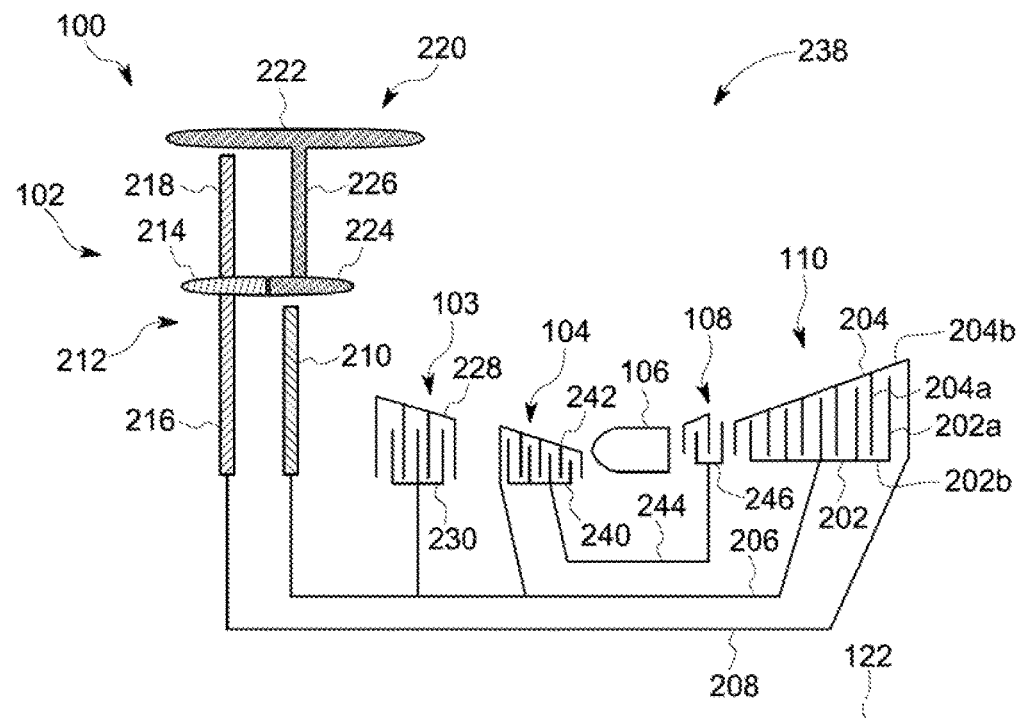
FIG. 4 is a schematic illustration of a third embodiment of the turbine engine assembly shown in FIG. 1.

FIG. 4 is a schematic illustration of a third embodiment 238 of turbine engine assembly 100. In the exemplary embodiment, high-pressure compressor assembly 104 includes a second rotor 240 and a third rotor 242. Second rotor 240 is coupled to a third drive shaft 244, which is coupled to a fourth rotor 246 of high-pressure turbine assembly 108. Third rotor 242 is coupled to first drive shaft 206. In operation, fourth rotor 246 rotates in the second rotational direction at a third rotational speed as combustion gas is channeled through high-pressure turbine assembly 108, which causes second rotor 240 to rotate in the second rotational direction at the third rotational speed. Moreover, as combustion gas is channeled through low-pressure turbine assembly 110, third rotor 242 rotates in the first rotational direction at the first rotational speed. As such, coupling third rotor 242 to first drive shaft 206 increases a loading on first drive shaft 206, which facilitates providing work split enhancement and enables turbine engine assembly 100 to have a larger bypass ratio when compared to first embodiment 200 (shown in FIG. 2). In an alternative embodiment, third embodiment 238 includes guide vane assembly 234 (shown in FIG. 3), which provides further flexibility in managing the work split between first fan section 210 and inner radial portion 216.

Figure 5:
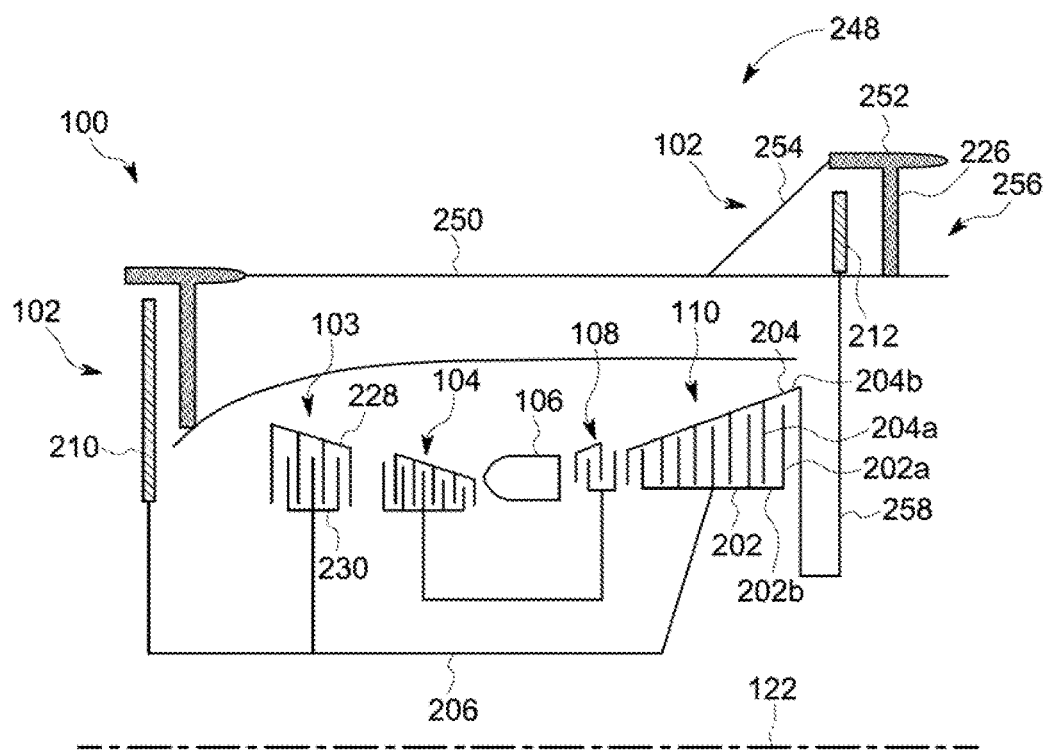
FIG. 5 is a schematic illustration of a fourth embodiment of the turbine engine assembly shown in FIG. 1.

FIG. 5 is a schematic illustration of a fourth embodiment 248 of turbine engine assembly 100. In the exemplary embodiment, fourth embodiment 248 includes a first nacelle housing 250 and a second nacelle housing 252 positioned radially outward from and circumscribing first nacelle housing 250. Specifically, at least one strut 254 extending between first and second nacelle housings 250 and 252 couples second nacelle housing 252 to first nacelle housing 250. Second nacelle housing 252 is positioned at an aft portion 256 of turbine engine assembly 100 such that second fan section 212 is positioned aft of first fan section 210, as will be described in more detail below. In an alternative embodiment, outer guide vane 226 is omitted and strut 254 provides preswirl to second fan section 212.

In the exemplary embodiment, second fan section 212 is coupled to second turbine section 204. Specifically, second fan section 212 is positioned aft of first fan section 210 and is coupled to second turbine section 204 via a coupling member 258. Second fan section 212 extends radially outward from second turbine section 204 and beyond first nacelle housing 250. As such, at least a portion of second fan section 212 extends between first nacelle housing 250 and second nacelle housing 252, which facilitates increasing a bypass ratio of turbine engine assembly 100. Moreover, omitting second drive shaft 208 (shown in FIG. 2) from turbine engine assembly 100 enables fourth embodiment 248 to have a lower weight when compared to first, second, and third embodiments 200, 232, and 238. In an alternative embodiment, second nacelle housing 252 is omitted from turbine engine assembly 100 such that second fan section 212 forms an unducted fan assembly.

Figure 6:
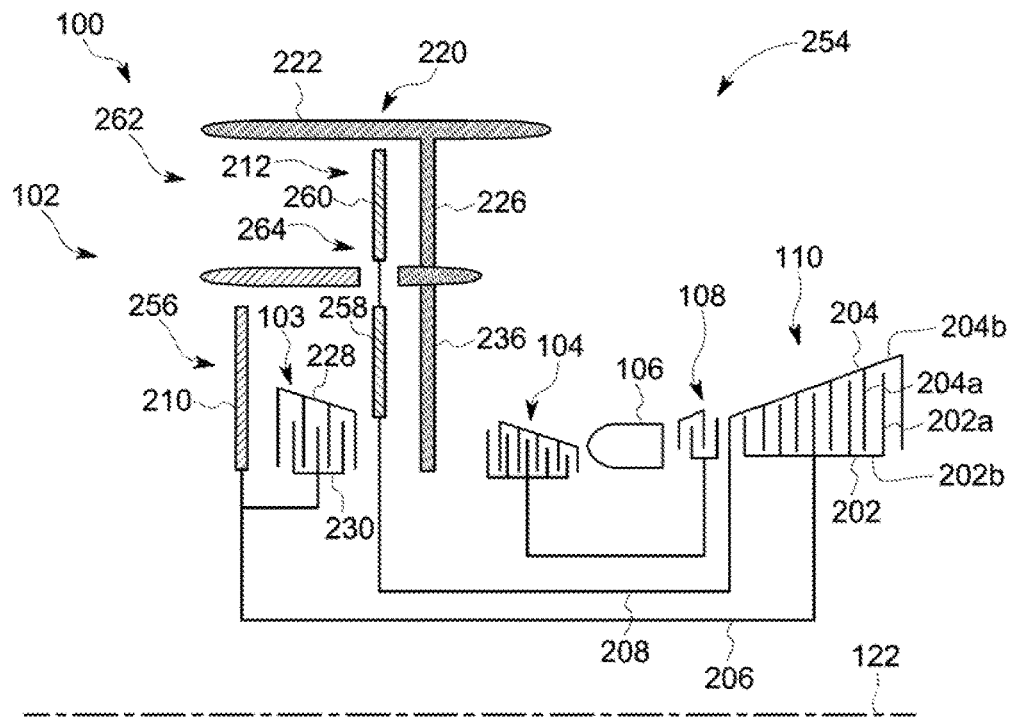
FIG. 6 is a schematic illustration of a fifth embodiment of the turbine engine assembly shown in FIG. 1.

FIG. 6 is a schematic illustration of a fifth embodiment 254 of turbine engine assembly 100. In the exemplary embodiment, first fan section 210 extends a first distance from centerline 122 of turbine engine assembly 100, and second fan section 212 extends a second greater distance from centerline 122. Second fan section 212 is positioned aft of first fan section 210 such that first fan section 210 defines a first forward fan face 256. Moreover, second fan section 212 includes an inner radial fan section 258 and an outer radial fan section 260. Outer radial fan section 260 is positioned radially outward from first fan section 210 within a first bypass flow path 262 such that a second forward fan face 264 is defined. As such, second forward fan face 264 is not obstructed by first fan section 210, and relative ingestion of air into turbine engine assembly 100 is controlled by varying the fan speeds of first and second fan sections 210 and 212. Further, inner radial fan section 258 is positioned aft of first fan section 210. In one embodiment, inner radial fan section 258 defines a guide vane that rotates in the second rotational direction at the second rotational speed.

Figure 7:
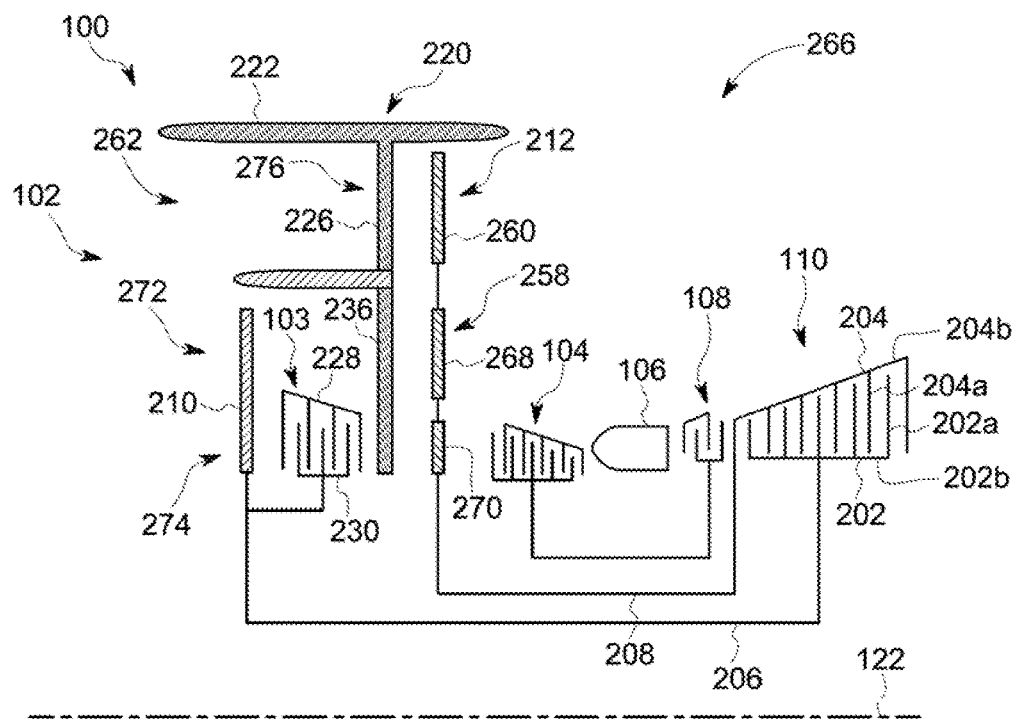
FIG. 7 is a schematic illustration of a sixth embodiment of the turbine engine assembly shown in FIG. 1.

FIG. 7 is a schematic illustration of a sixth embodiment 266 of turbine engine assembly 100. In the exemplary embodiment, inner radial fan section 258 includes a radially outer portion 268 and a radially inner portion 270. Radially outer portion 268 is positioned within a second bypass flow path 272 and radially inner portion 270 is positioned within a core flow path 274. Radially outer portion 268 and radially inner portion 270 each define a guide vane that rotates in the second rotational direction at the second rotational speed within their respective flow paths. Moreover, a guide vane assembly 276, including outer guide vane 226 and inner guide vane 236, is positioned between first and second fan sections 210 and 212.

Figure 8:
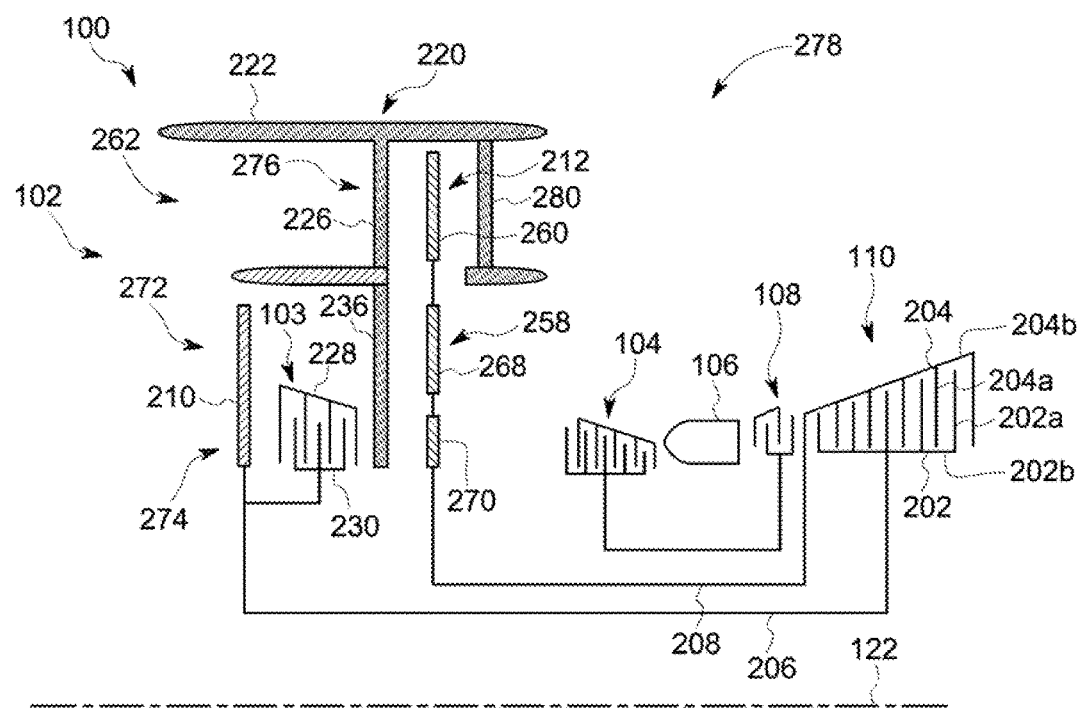
FIG. 8 is a schematic illustration of a seventh embodiment of the turbine engine assembly shown in FIG. 1.

FIG. 8 is a schematic illustration of a seventh embodiment 278 of turbine engine assembly 100. In the exemplary embodiment, turbine engine assembly 100 includes guide vane assembly 276 positioned between first and second fan sections 210 and 212, and includes a variable guide vane 280 positioned aft of second fan section 212. As such, variable guide vane 280 provides additional directional flow control for air channeled through first bypass flow path 262.

The turbine engine assembly and methods described herein relate to turbine engines that utilize counter-rotating low-pressure turbine assemblies to reduce a fan tip speed of a fan assembly without a gearbox. More specifically, a first low-pressure turbine section rotates in a first rotational direction at a first rotational speed and is coupled to a first fan section, and a second low-pressure turbine section rotates in a second rotational direction at a second rotational speed and is coupled to a second fan section. The first direction is opposite the second direction, and the first rotational speed is greater than the second rotational speed. The second fan section generally extends a greater radial distance than the first fan section, and the fan tip speed of the second fan section is controlled when rotated at the slower second rotational speed. As such, the turbine engine assembly described herein enables the fan tip speed of the larger radius fan section to be reduced in a more-efficient and simplified manner.

An exemplary technical effect of the turbine engine and methods described herein includes at least one of: (a) decoupling low-pressure turbine speed from fan tip speed without a gearbox; (b) reducing the complexity of the turbine engine; and (c) increasing a bypass ratio of the turbine engine.

Exemplary embodiments of the gas turbine engine are described above in detail. The assembly is not limited to the specific embodiments described herein, but rather, components of systems and/or steps of the methods may be utilized independently and separately from other components and/or steps described herein. For example, the configuration of components described herein may also be used in combination with other processes, and is not limited to practice with only gas turbine engines and related methods as described herein. Rather, the exemplary embodiment can be implemented and utilized in connection with many applications where decreasing fan tip speed is desirable.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine assembly comprising:
a low-pressure turbine assembly comprising:
a first turbine section disposed within an outer casing and comprising a plurality of blades coupled to an inner rotor structure and configured to rotate in a first rotational direction at a first rotational speed; and
a second turbine section disposed within the outer casing and comprising a plurality of blades coupled to the outer casing and configured to rotate in a second rotational direction at a second rotational speed, the second rotational direction opposite the first rotational direction and the second rotational speed lower than the first rotational speed, wherein the plurality of blades of the first turbine section are arranged in an alternating fashion with the plurality of blades of the second turbine section;
a first drive shaft coupled to said first turbine section; and a fan assembly comprising:
a first fan section coupled to said first drive shaft such that said first fan section is configured to rotate in the first rotational direction at the first rotational speed; and
a second fan section coupled to said second turbine section such that said second fan section is configured to rotate in the second rotational direction at the second rotational speed.

2. The turbine engine assembly in accordance with claim 1 further comprising a second drive shaft coupled to said second turbine section, said second fan section coupled to said second drive shaft such that said second fan section is configured to rotate in the second rotational direction at the second rotational speed.

3. The turbine engine assembly in accordance with claim 1, wherein said second fan section comprises a splitter defining an inner radial portion and an outer radial portion.

4. The turbine engine assembly in accordance with claim 1, wherein said second fan section extends a greater radial distance from a centerline of the turbine engine assembly than said first fan section.

5. The turbine engine assembly in accordance with claim 1 further comprising a high-pressure compressor assembly comprising a second rotor coupled to said first drive shaft such that said second rotor is configured to rotate in the first rotational direction at the first rotational speed.

6. The turbine engine assembly in accordance with claim 1 further comprising a first nacelle housing, said second fan section extending radially outward from said second turbine section and beyond said first nacelle housing.

7. The turbine engine assembly in accordance with claim 6 further comprising a second nacelle housing positioned radially outward from and substantially circumscribing said first nacelle housing such that at least a portion of said second fan section extends between said first and second nacelle housings.

8. A turbine engine assembly comprising:
a low-pressure turbine assembly comprising:
a first turbine section disposed within an outer casing and comprising a plurality of blades coupled to an inner rotor structure and configured to rotate in a first rotational direction at a first rotational speed; and
a second turbine section disposed within the outer casing and comprising a plurality of blades coupled to the outer casing and configured to rotate in a second rotational direction at a second rotational speed, the second rotational direction opposite the first rotational direction and the second rotational speed lower than the first rotational speed, wherein the plurality of blades of the first turbine section are arranged in an alternating fashion with the plurality of blades of the second turbine section;
a first drive shaft coupled to said first turbine section;
a second drive shaft coupled to said second turbine section; and a fan assembly comprising:
- a first fan section coupled to said first drive shaft such that said first fan section is configured to rotate in the first rotational direction at the first rotational speed, said first fan section extending a first radial distance from a centerline of the turbine engine assembly to define a first forward fan face; and
- a second fan section coupled to said second drive shaft such that said second fan section is configured to rotate in the second rotational direction at the second rotational speed, said second fan section extending a second greater radial distance from the centerline to define a second forward fan face.

9. The turbine engine assembly in accordance with claim 8, wherein said second fan section is positioned aft of said first fan section.

10. The turbine engine assembly in accordance with claim 8, wherein said second fan section comprises an inner radial fan section and an outer radial fan section, said outer radial fan section defining said second forward fan face positioned within a first bypass flow path.

11. The turbine engine assembly in accordance with claim 10, wherein said inner radial fan section is positioned aft of said first fan section, said inner radial fan section defining a guide vane configured to rotate in the second rotational direction at the second rotational speed.

12. The turbine engine assembly in accordance with claim 10, wherein said inner radial fan section comprises a radially outer portion and a radially inner portion, said radially outer portion positioned within a second bypass flow path and said radially inner portion positioned within a core flow path.

13. The turbine engine assembly in accordance with claim 8 further comprising a guide vane assembly positioned between said first and second fan sections.

14. The turbine engine assembly in accordance with claim 13 further comprising a variable guide vane positioned aft of said second fan section.

15. A method of manufacturing a turbine engine assembly, said method comprising:
- coupling a first low-pressure turbine section to a first drive shaft, the first low-pressure turbine section disposed within an outer casing and comprising a plurality of blades coupled to an inner rotor structure and configured to rotate in a first rotational direction at a first rotational speed;
- coupling the first drive shaft to a first fan section such that the first fan section is configured to rotate in the first rotational direction at the first rotational speed; and
- coupling a second fan section to a second low-pressure turbine section, the second low-pressure turbine section disposed within the outer casing and comprising a plurality of blades coupled to the outer casing and configured to rotate in a second rotational direction at a second rotational speed such that the second fan section rotates in the second rotational direction at the second rotational speed, the second rotational direction opposite the first rotational direction and the second rotational speed is lower than the first rotational speed, wherein the plurality of blades of the first turbine section are arranged in an alternating fashion with the plurality of blades of the second turbine section.

16. The method in accordance with claim 15, wherein coupling a second fan section comprises coupling a second drive shaft to the second fan section and the second-low-pressure turbine section such that the second fan section rotates in the second rotational direction at the second rotational speed.

17. The method in accordance with claim 15 further comprising extending the second fan section a greater radial distance from a centerline of the turbine engine assembly than the first fan section.

18. The method in accordance with claim 17 further comprising positioning the second fan section aft of the first fan section such that the first fan section defines a first forward fan face, and such that the second fan section defines a second forward fan face.

19. The method in accordance with claim 15 further comprising extending the second fan section radially outward from the second turbine section and beyond a first nacelle housing.

20. The method in accordance with claim 19 further comprising positioning a second nacelle housing radially outward from and substantially circumscribing the first nacelle housing such that at least a portion of the second fan section extends between the first and second nacelle housings.

* * * * *